Patented July 28, 1936

2,048,822

UNITED STATES PATENT OFFICE 2,048,822

ANTIOXIDANT

Waldo L. Semon, Silver Lake Village, Ohio, assignor to The B. F. Goodrich Company, New York, N. Y., a corporation of New York No Drawing. Application December 9, 1933, Serial No. 701,728

18 Claims. (Cl. 18—50)

This invention relates to the preparation of certain improved anti-oxidants adapted to preserve organic materials such as rubber, fatty oils, petroleum products, synthetic plastics and the like against unduly rapid deterioration due to oxidation, polymerization, mechanical fatigue, etc. The process by which the anti-oxidants are prepared is claimed in my co-pending application Serial No. 701,727 filed December 9, 1933.

The anti-oxidants of this invention are prepared in general by reacting an aromatic monoamine with another aromatic amine of a type defined below, which latter amine may be prepared by reacting a ketone with an aromatic mono-amine. The first stage of the reaction accordingly involves the condensation of the aromatic amine with the ketone, with the elimination of water and the formation of either a diphenyl-methane type of compound I or a substituted amine II, in accordance with the following general reaction:

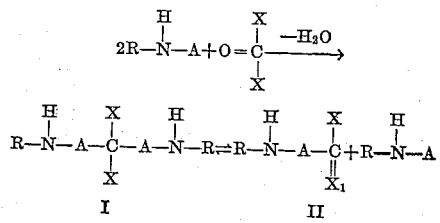

wherein R represents hydrogen or a hydrocarbon radical, A represents an aromatic hydrocarbon residue, and X represents a hydrocarbon radical ($X_1$ is a bivalent radical derived from X by the removal of another hydrogen atom). The second stage of the reaction involves the further reaction of the intermediate products I or II or both with the same or a different amine to give the final product.

In the general equation reproduced above, the radical R when it is not hydrogen may be an alkyl, aralkyl or aryl radical, or even a substituted radical containing neutral substituents such as alkoxy groups, and therefore embraces such typical radicals as hydrogen, methyl, ethyl, propyl, isopropyl, butyl, benzyl, phenyl, tolyl, xylyl, cumyl, zenyl, naphthyl, anisyl, phenetyl, p-morpholyl-phenyl, etc. The aromatic residue A may be a benzene, toluene, biphenyl, naphthyl or like residue, preferably one containing a free ortho or para position or both, since the amines are preferentially reactive in these positions. Typical amines which may be used in the initial stage of the reaction therefore include aniline, toluidine, xylidine, xenylamine, naphthylamine, methyl aniline, benzyl aniline, diphenylamine, phenyl p-tolyl amine, phenyl p-cumyl amine, phenyl naphthylamine, ditolylamine, etc., and may even include tertiary amines such as dimethylaniline under certain conditions which will be further discussed below. In the second ingredient the radicals X may be like or unlike alkyl, aralkyl or aryl radicals or even simple unsaturated or substituted radicals, such as methyl, ethyl, propyl, butyl, benzyl, phenyl, tolyl, hydroxybutyl, butenyl or the like; or even a single bivalent polymethylene radical. The second ingredient therefore embraces such typical ketones as acetone, methyl ethyl ketone, methyl isobutyl ketone, diacetone alcohol, mesityl oxide, acetophenone, diethyl ketone, dibutyl ketone, cyclopentanone, cyclohexanone, methyl cyclohexanone, and the like. It is not intended that the term ketone shall be understood to include compounds whose properties are essentially due to the presence of reactive groupings other than the ketonic carbonyl group, such as halogens, acid groups and the like, but only compounds such as those enumerated above, which exhibit the characteristic properties of ketones.

The initial reaction between the amine and the ketone is preferably carried on in the presence of an acidic catalyst. The commercial raw materials will frequently contain sufficient acid to promote the desired reaction, but it is ordinarily preferred to add a catalyst such as hydrochloric acid, hydrobromic acid, sulphuric acid, phosphoric acid, calcium chloride, zinc chloride, or iodine. Although it is not essential in all cases, the best results are obtained by avoiding any excess of the ketone over that theoretically necessary for the reaction. In fact it is preferred to carry out the reaction with at least two mols of amine for each mol of ketone, and generally with a considerable excess of the amine. It is important that the conditions of the reaction be so chosen as to avoid the formation of unwanted by-products such as quinoline derivatives. The primary aromatic amines such as aniline, in particular, readily form quinoline compounds when heated with large proportions of acetone or other similar ketones. This undesirable side-reaction can be minimized by reducing the proportion of the ketone, employing instead an excess of the primary amine, and particularly by carrying out the reaction in the presence of water and a somewhat larger proportion of acid, which tends to favor the reaction in accordance with the general equations set forth above, probably by reason of the intermediate formation of certain ammonium compounds in the aqueous medium. Secondary amines do not generally undergo the quinoline reaction, hence the presence of water is not so essential when secondary amines are used in the reaction. The reaction may be carried out by heating a mixture of the two ingredients including the catalyst, usually hydrochloric acid, either at atmospheric pressure, with the provision of a reflux condenser to return volatile ingredients if necessary, or in an autoclave, or in solution in water or other suitable solvent. The temperature required will vary according to the particular ingredients used, but will ordinarily be above 80° C. and generally well below 200° C., although somewhat higher temperatures may occasionally be found useful in this step of the reaction.

The reaction of the original amine with the ketone tends to produce a mixture of a diamino diaryl methane derivative, designated as I in the equation above, and of a substituted mono-amine, designated as II, sometimes accompanied by some of the unchanged original amine or unreacted ketone or both. These intermediate amines may be designated as acyclic amines in the sense that the amino group does not form any part of a ring and are to be distinguished from heterocyclic bases such as are found in the final product. The diamines of type I tend to predominate when the simpler amines are reacted with low molecular weight ketones, while substituted mono-amines of type II tend to predominate when higher molecular weight ketones and particularly cyclic ketones such as cyclohexanone are used. However, these two types of amines appear to be interchangeable one for the other and to form similar or identical final products when carried through the second step of the reaction, hence it is not generally necessary to separate the two types of intermediate amines either from each other or from any unchanged raw material which may be present. Nevertheless, a preliminary separation or purification of the intermediate amine may be desirable in some cases, particularly where it is desired to react the intermediate amine in the second step of the process with a different amine than that originally used in the first step.

The second step in the process, involving the reaction of the intermediate amine with a further mono-amine, is carried out in general in the same manner as the first, except that a higher temperature is generally required, ranging from about 150 to 300° C. or more, according to the nature of the reagents involved, but is generally above 200° C. In the course of the second step the intermediate amines I or II apparently undergo a molecular rearrangement, in which the free mono-amine which is present or which is added participates, with the formation of a product, which in some cases consists largely of heterocyclic compounds containing the atomic grouping characteristic of acridane derivatives. This product, regardless of its precise chemical nature, is an excellent anti-oxidant and retarder of deterioration, both in its crude state and after purification and separation into its constituents.

The preferred embodiments of this invention are those in which simple mono or diaryl amines are employed both in the initial reaction with the ketone and in the subsequent reaction with the intermediate amines. Nevertheless, any of the other amines of the types disclosed above may be substituted, and, as has already been suggested, even tertiary amines may be used, but it is preferred to use tertiary amines in only one step of the reaction, preferably the first step, but not both. When a diarylamine is used in the first step of the reaction to produce a diamine of type I it is even possible to dispense with the addition of a free mono-amine in the second step, since the diaryl substituted diamine of type I undergoes the desired rearrangement to some extent even when heated alone, probably by reason of a preliminary dissociation into a substituted amine of type II and a free diarylamine, and the subsequent recombination of these amines to give the final product.

In case the same amine is employed for both steps of the process, the two steps may be combined by heating the mixture of materials containing the necessary excess of amine continuously up to the final high temperature. The two reactions described above will then take place successively in the mixture to give the same product as would be obtained by carrying out the steps separately.

The invention will be best understood by reference to the following specific examples, in which the simplest mono and diarylamines, aniline and diphenylamine, and the simplest ketone, acetone, are employed for illustrative purposes, but will be understood that any of the other materials described above may be substituted with suitable changes in proportions and in the conditions of the reaction.

*Example 1.*—372 parts by weight of aniline are mixed with 58 parts of acetone and 392 parts of concentrated hydrochloric acid diluted with 100 parts of water, and the mixture is heated for about 8 hours to a temperature of about 160° C. in an autoclave. A further 186 parts of aniline are added to the crude mixture and heating is continued for 2 hours at about 240° C. The product is neutralized with an aqueous alkaline solution and unreacted aniline is distilled off. The product is a complex mixture of aromatic and heterocyclic bases, and is an excellent anti-oxidant.

*Example 2.*—372 parts by weight of aniline are mixed with 58 parts of acetone and 392 parts of concentrated hydrochloric acid diluted with 100 parts of water, and the mixture is heated for about 8 hours to a temperature of about 160° C. in an autoclave. The mixture is then neutralized with an aqueous alkaline solution and separated from the aqueous salt solution. 10 parts of concentrated hydrochloric acid are added to the mixture of amines, consisting largely of a mixture of p,p'diamino diphenyl 2,2propane with an excess of free aniline, to reacidify it, and it is heated under a reflux condenser for about 12 hours to a temperature high enough to induce gentle boiling. The product is very similar to that of Example 1 above.

*Example 3.*—372 parts by weight of aniline are mixed with 58 parts of acetone and 392 parts of concentrated hydrochloric acid diluted with 100 parts of water, and the mixture is heated for about 8 hours to a temperature of about 160° C. in an autoclave. The mixture is then neutralized with an aqueous alkaline solution, and the unreacted aniline is distilled off, leaving practically pure p,p'diamino diphenyl 2,2propane. 340 parts of diphenylamine and 25 parts of concentrated hydrochloric acid are added, and the mixture is heated for 8 hours at 240° C. The product is neutralized and aniline and diphenylamine are removed by distillation in a vacuum. The product resembles that of Example 1.

*Example 4.*—1400 parts by weight of diphenylamine are mixed with 58 parts of acetone and 74 parts of concentrated hydrochloric acid, and the mixture is heated for 6 hours at about 135° C. in an autoclave, by which time the acetone has almost completely reacted with a portion of the diphenylamine to form p,p'dianilino diphenyl 2,2propane. The temperature is then increased to 260° C. for 2 hours to induce the reaction of the p,p'dianilino diphenyl 2,2propane with the excess of free diphenylamine. The product is cooled to about 100° and neutralized with hot caustic solution and finally distilled in a vacuum to remove the excess unreacted diphenylamine. The residue is very similar to the product of Example 1. If desired, the temperature may be raised to the ultimate temperature of 260° C. at the beginning of the reaction and maintained at that temperature for 3 hours, in which case an almost identical product is formed in a shorter time.

*Example 5.*—1400 parts by weight of diphenylamine are mixed with 58 parts of acetone and 74 parts of concentrated hydrochloric acid, and the mixture is heated for 6 hours at about 135° C. in an autoclave. The product is then washed with a hot alkaline solution to neutralize the acid, and finally with boiling water. It is then distilled under a vacuum until substantially all the diphenylamine is removed. The residue weighing about 370 parts consists largely of p,p'dianilino diphenyl 2,2propane. It is mixed with 375 parts of aniline and 100 parts of concentrated hydrochloric acid and heated for 3½ hours at about 280° C. The product, after neutralization and removal of unreacted aniline and any low-boiling by-products by distillation, is an anti-oxidant resembling that of Example 1.

*Example 6.*—p,p'dianilino diphenyl 2,2propane, which may be prepared in the manner described in Example 5 above, is mixed with 4% of its weight of concentrated hydrochloric acid and heated for 2 hours at about 255° C. The product, after neutralization and washing is a good anti-oxidant.

Any of the anti-oxidants of this invention, and specifically any one of the products prepared by the methods outlined in detail above, may be employed to retard the deterioration of rubber either before or after vulcanization. It is generally preferred to incorporate the anti-oxidant into the rubber before vulcanization, in the proportion of from 0.1% to 5% by weight. For example, a tire tread composition containing 100 parts by weight of rubber, 45 parts of carbon black, 5 parts of zinc oxide, 2 parts of pine tar, 2 parts of stearic acid, 3.25 parts of sulfur, 0.50 part of vulcanization accelerator such as polybutylidene aniline, and 1 part of one of the anti-oxidants described above, when vulcanized 60 minutes at 295° F. (145° C.) to produce an optimum cure, not only resists deterioration for approximately twice as long as the composition without the anti-oxidant, but also greatly retards the formation of cracks upon rapidly repeated flexing. The anti-oxidants of this invention can similarly be employed in other types of rubber compositions such as those used in the manufacture of tire carcasses, inner tubes, belting, hose, footwear, bath caps, hot water bottles, dipped goods, and the like.

It is to be understood that the term "treating" as employed in the appended claims is used in a generic sense to include either the incorporation of the anti-oxidants into the rubber by milling or similar process, or by mixing with the latex before coagulation, or by application to the surface of crude or vulcanized rubber, for example, in the form of a paste, powder, or liquid. The term "rubber" is likewise employed in the claims in a generic sense to include caoutchouc, balata, gutta-percha, rubber isomers and like products, whether or not admixed with fillers, pigments, softeners, vulcanizing agents, and the like.

While I have herein disclosed with considerable particularity certain preferred manners of performing my invention, I do not thereby desire or intend to limit myself solely thereto, for as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with the reaction product produced in the presence of an acidic condensation catalyst and at a temperature higher than that at which the intermediate amine is formed and not lower than 200° C., of an aromatic amine and an acyclic intermediate amine obtained by the condensation of one mol. of a ketone with from one to two mols of an aromatic amine.

2. The method of preserving rubber which comprises treating rubber with the reaction product produced in the presence of an acidic condensation catalyst and at a temperature higher than that at which the intermediate amine is formed and not lower than 200° C., of a mono-amine containing only aryl substituents and containing a replaceable hydrogen on the amino group, and an acyclic intermediate amine obtained by the reaction of one mol. of a ketone with from one to two mols of an aromatic amine.

3. The method of preserving rubber which comprises treating rubber with the reaction product produced in the presence of an acidic condensation catalyst and at a temperature higher than that at which the intermediate amine is formed and not lower than 200° C., of a mono-amine containing only aryl substituents and containing a replaceable hydrogen on the amino group, and an acyclic intermediate amine obtained by the reaction of one mol. of an aliphatic ketone with from one to two mols of a mono-amine of the type defined above.

4. The method of preserving rubber which comprises treating rubber with the reaction product produced in the presence of an acidic condensation catalyst and at a temperature higher than that at which the intermediate amine is formed and not lower than 200° C., of a mono-amine containing only aryl substituents and containing a replaceable hydrogen on the amino group, and an acyclic intermediate amine obtained by the reaction of one mol. of acetone with from one to two mols of mono-amine of the type defined above.

5. The method of claim 4, in which the aryl substituents in the mono-amines are phenyl groups.

6. The method of preserving rubber which comprises treating rubber with the reaction product produced in the presence of an acidic condensation catayst and at a temperature higher than that at which the intermediate amine is formed and not lower than 200° C., of a diarylamine and an acyclic intermediate amine obtained by the reaction of one mol. of an aliphatic ketone with from one to two mols of a monoamine containing only aryl substituents and containing a replaceable hydrogen on the amino group.

7. The method of preserving rubber which comprises treating rubber with the reaction product produced in the presence of an acidic condensation catalyst and at a temperature higher than that at which the intermediate amine is formed and not lower than 200° C., of a diarylamine and an acyclic intermediate amine obtained by the reaction of one mol. of an aliphatic ketone with from one to two mols of a diarylamine.

8. The method of preserving rubber which comprises treating rubber with the reaction product produced in the presence of an acidic condensation catalyst and at a temperature higher than that at which the intermediate amine is formed and not lower than 200° C., of diphenylamine and an acyclic intermediate amine obtained by the reaction of one mol. of a ketone with from one to two mols of diphenylamine.

9. The method of preserving rubber which comprises treating rubber with the reaction product produced in the presence of an acidic condensation catalyst and at a temperature of at least 200° C., of diphenylamine and p,p'dianilino diphenyl 2,2 propane.

10. The method of preserving rubber which comprises treating rubber with the reaction product produced in the presence of an acidic condensation catalyst and at a temperature higher than that at which the intermediate amine is formed and not lower than 200° C., of a diarylamine and an acyclic intermediate amine obtained by the reaction of one mol. of a ketone with from one to two mols of a mono-aryl amine.

11. The method of preserving rubber which comprises treating rubber with the reaction product in the presence of an acidic condensation catalyst and at a temperature higher than that at which the intermediate amine is formed and not lower than 200° C., of diphenylamine and an acyclic intermediate amine obtained by the reaction of one mol. of an aliphatic ketone with from one to two mols of aniline.

12. The method of preserving rubber which comprises treating rubber with the reaction product produced in the presence of an acidic condensation catalyst and at a temperature of at least 200° C. of diphenylamine and p,p'diamino diphenyl 2,2propane.

13. The method of preserving rubber which comprises treating rubber with the product of the reaction of one mol. of a ketone with at least two mols of an aromatic amine at a temperature of at least 200° C. and in the presence of an acidic condensation catalyst.

14. The method of preserving rubber which comprises treating rubber with the product of the reaction of one mol. of acetone with at least two mols of diphenylamine at a temperature of at least 200° C. and in the presence of an acidic condensation catalyst.

15. A rubber composition comprising rubber and the reaction product defined in claim 3.

16. A rubber composition comprising rubber and the reaction product defined in claim 9.

17. A rubber composition comprising rubber and the reaction product defined in claim 12.

18. A rubber composition comprising rubber and the reaction product defined in claim 14.

WALDO L. SEMON.

CERTIFICATE OF CORRECTION.

Patent No. 2,048,822.

July 28, 1936.

WALDO L. SEMON.

It is hereby certified that error appears in the printed specification of the above numbered patent requiring correction as follows: Page 2, second column, line 25, after the word "but" insert the word it; page 4, second column, lines 3 and 4, claim 11, for the words "product in the" read product produced in the; and that the said Letters Patent should be read with these corrections therein that the same may conform to the record of the case in the Patent Office.

Signed and sealed this 11th day of May, A. D. 1937.

Henry Van Arsdale
Acting Commissioner of Patents.

(Seal)